United States Patent
Kitayama et al.

(10) Patent No.: US 8,167,357 B2
(45) Date of Patent: May 1, 2012

(54) DUAL ACTION REAR HATCH

(75) Inventors: Kenichi Kitayama, Tochigi (JP);
Michael A. Schrader, Plain City, OH (US); Matthew Weyand Schmitt, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/851,813

(22) Filed: Aug. 6, 2010

(65) Prior Publication Data
US 2012/0032472 A1 Feb. 9, 2012

(51) Int. Cl.
*B60J 5/12* (2006.01)
*B60J 7/04* (2006.01)
(52) U.S. Cl. ............... 296/146.8; 296/216.02; 296/106
(58) Field of Classification Search ............. 296/76, 296/106, 146.8, 216.02, 216.04, 216.05, 296/57.1, 147, 219, 217, 222, 100.01, 146.16, 296/165
See application file for complete search history.

(56) References Cited

U.S. PATENT DOCUMENTS

| | | | |
|---|---|---|---|
| 1,889,679 A | 11/1932 | Marin | |
| 2,086,091 A | 7/1937 | Payette | |
| 2,596,355 A | 5/1952 | Ackermans | |
| 2,997,336 A | 8/1961 | Huggins et al. | |
| 3,214,213 A | 10/1965 | Helzer, Jr. et al. | |
| 3,378,298 A | 4/1968 | Wingen | |
| 3,419,304 A | 12/1968 | Sangimino | |
| 4,272,121 A | 6/1981 | Kim | |
| 4,274,670 A | 6/1981 | Pitzmann | |
| 4,323,274 A | 4/1982 | Soderberg et al. | |
| 4,620,743 A | 11/1986 | Eke | |
| 4,659,136 A | 4/1987 | Martin et al. | |
| 4,707,014 A | 11/1987 | Rich | |
| 4,712,827 A | 12/1987 | Jensen | |
| 5,183,310 A * | 2/1993 | Shaughnessy | 296/106 |
| 5,294,170 A | 3/1994 | Hsueh | |
| 5,921,611 A | 7/1999 | Townsend | |
| 5,997,072 A | 12/1999 | Parkinson | |
| 6,007,139 A | 12/1999 | Shave | |
| 6,241,302 B1 | 6/2001 | Rehkopf | |
| 6,305,740 B1 | 10/2001 | Staser et al. | |
| 6,447,050 B1 | 9/2002 | Plassmeyer et al. | |
| 6,485,094 B2 | 11/2002 | Corder et al. | |
| 6,494,528 B2 | 12/2002 | Tolinski et al. | |
| 6,505,878 B1 | 1/2003 | Mascolo | |

(Continued)

FOREIGN PATENT DOCUMENTS

DE 19513520 * 8/1996

(Continued)

OTHER PUBLICATIONS

Motorsnaps.com, http://www.motorsnaps.com/d/28353-3/2002+Webasto++Welcome.jpg.*

(Continued)

*Primary Examiner* — Dennis Pedder
(74) *Attorney, Agent, or Firm* — Rankin Hill & Clark LLP

(57) ABSTRACT

A vehicle includes a vehicle body having a hatch frame slidably mounted thereto. A hatch closure is pivotally mounted to the hatch frame. The hatch frame is slidably movable between a slide closed position and a slide open position and the hatch closure is pivotally movable between a pivot closed position and a pivot open position.

14 Claims, 6 Drawing Sheets

U.S. PATENT DOCUMENTS

| | | | |
|---|---|---|---|
| 6,695,377 B2 * | 2/2004 | Paiva et al. | 296/56 |
| 6,789,830 B2 | 9/2004 | Van Bussel | |
| 6,874,838 B2 | 4/2005 | De Gaillard | |
| 7,029,058 B2 | 4/2006 | Mathew | |
| 7,032,962 B2 | 4/2006 | Engelgau | |
| 7,140,657 B2 | 11/2006 | Cuma | |
| 7,334,833 B2 | 2/2008 | Koelbl et al. | |
| 7,354,095 B2 | 4/2008 | Fleming et al. | |
| 7,438,342 B2 * | 10/2008 | Greenwood | 296/100.02 |
| 7,494,175 B2 | 2/2009 | Condon et al. | |
| 7,651,148 B2 | 1/2010 | Hustyi et al. | |
| 2005/0253406 A1 | 11/2005 | Faubert et al. | |
| 2008/0315632 A1 * | 12/2008 | Righetti | 296/217 |

FOREIGN PATENT DOCUMENTS

| | | |
|---|---|---|
| JP | 62210124 | 9/1987 |
| JP | 1289773 | 11/1989 |

OTHER PUBLICATIONS

Citroen C3 Pluriel—photographs 1 and 2.
Renault Be-Bop—photographs 1 and 2.
GMC Envoy XUV—photograph 1.
Webasto Welcome Concept—photograph 1.
Studebaker Wagonaire—photograph 1.
U.S. Appl. No. 12/851,897, filed Aug. 6, 2010, Titled "Spoiler for Rear Hatch Closure Assembly".
U.S. Appl. No. 12/851,899, filed Aug. 6, 2010, Titled "Slide Hatch Assembly".
U.S. Appl. No. 12/851,889, filed Aug. 6, 2010, Titled "Closure Assembly for Vehicle".
Office Action of U.S. Appl. No. 12/851,899 dated Jul. 19, 2011.
Office Action of U.S. Appl. No. 12/851,889 dated Jul. 19, 2011.
Office Action of U.S. Appl. No. 12/851,889 dated Nov. 1, 2011.

* cited by examiner

DUAL ACTION REAR HATCH

BACKGROUND

The present disclosure generally relates to vehicles, and more particularly relates to a dual action rear hatch for a vehicle.

Vehicle design is often focused on providing increased and/or improved cargo carrying capabilities for vehicles. This is particularly important for smaller, compact vehicles where there is often limited space available to dedicate to carrying cargo. Many smaller vehicles incorporate a flip-up hatch closure on the rear of the vehicle for providing access into the rear of the vehicle. Some hatch closures include a lower hatch closure that flips down and an upper hatch closure that flips up. Whether the entire hatch closure or only an upper hatch closure flips-up, these designs are often limited in that the vehicle is not designed to be driven with the hatch closures in the flipped-up positions.

Several known vehicles are configured in an attempt to provide improved cargo carrying capabilities for the vehicle. One such vehicle is the 2004 Citroen C3 Pluriel. This vehicle has a retractable soft top with a pivotable closure provided in a rear portion of the soft top facing a rear of the vehicle, and also has a drop-down tailgate disposed below the pivotable closure in the rear of the vehicle. The pivotable closure can be pivoted upward and the tailgate pivoted downward to provide a large cargo opening into the rear of the vehicle. Drawbacks of this arrangement relate to the use of a soft top and range from undesirable road noise entering the vehicle to insufficient durability to limited theft prevention.

Another known vehicle is the Renault Be-Bop concept vehicle shown at the 2003 Frankfurt Motor Show. This vehicle has a rear tailgate and an adjacent sliding roof panel. The tailgate has a vertically retractable window and is configured as a swing-out tailgate (i.e., the tailgate is pivoted open about a vertical axis). The sliding roof panel is movable to a slide open position forward along the vehicle's roof. When the tailgate is in the swing-open position and the roof panel is slid open, a large cargo opening is provided (i.e., the cargo opening includes the opening normally closed by the tailgate combined with the opening normally closed by the sliding roof panel. Drawbacks associated with this vehicle include its boxy and truck-like appearance and its use of exterior tracks for the sliding roof panel, which exposes the tracks to environmental elements and contributes to an overall unsightly appearance. Another similar vehicle is the 2003-2004 GMC Envoy XUV, but this vehicle uses a powered sliding roof panel, which significantly increases costs of the vehicle.

Still another known vehicle is the Webasto Welcome concept vehicle shown in or about 2002. This vehicle has a drop-down tailgate and an adjacent sliding roof panel, The tailgate and the roof panel can both be moved to their respective open positions for providing a combined rear cargo opening. Drawbacks of this vehicle include a boxy rear end and a relatively small sized cargo opening. Also, this sliding hatch is not optimally designed for driving while in the open position.

An older example vehicle with a similar combined rear cargo opening is the 1963 Studebaker Wagoneer. This vehicle is believed to be one of the first mass produced vehicles to offer a transforming rear cargo area. It includes a tailgate having a rear window that slides or retracts down into the tailgate body and a sliding roof panel disposed adjacent the tailgate. Drawbacks associated with this vehicle include severe water leak issues and the use of the inconvenient sliding rear window.

SUMMARY

According to one aspect, a vehicle includes a vehicle body having a hatch frame slidably mounted thereto. A hatch closure is pivotally mounted to the hatch frame. The hatch frame is slidably movable between a slide closed position and a slide open position and the hatch closure is pivotally movable between a pivot closed position and a pivot open position.

According to another aspect, a slide hatch assembly for selectively closing a rear cargo opening on a vehicle includes a hatch frame slidably mounted to a vehicle body of the vehicle for movement between a slide closed position and a slide open position. A hatch closure is mounted to the hatch frame for movement between a pivot closed position and a pivot open position when the hatch frame is in the slide closed position.

According to a further aspect, a rear closure assembly for a vehicle includes a first closure slidably mounted to a vehicle body of the vehicle for movement between a slide closed position and a slide open position. The rear closure assembly further includes a second closure pivotally mounted to the first closure for movement between a pivot closed position and a pivot open position.

DETAILED DESCRIPTION

Figure 1:
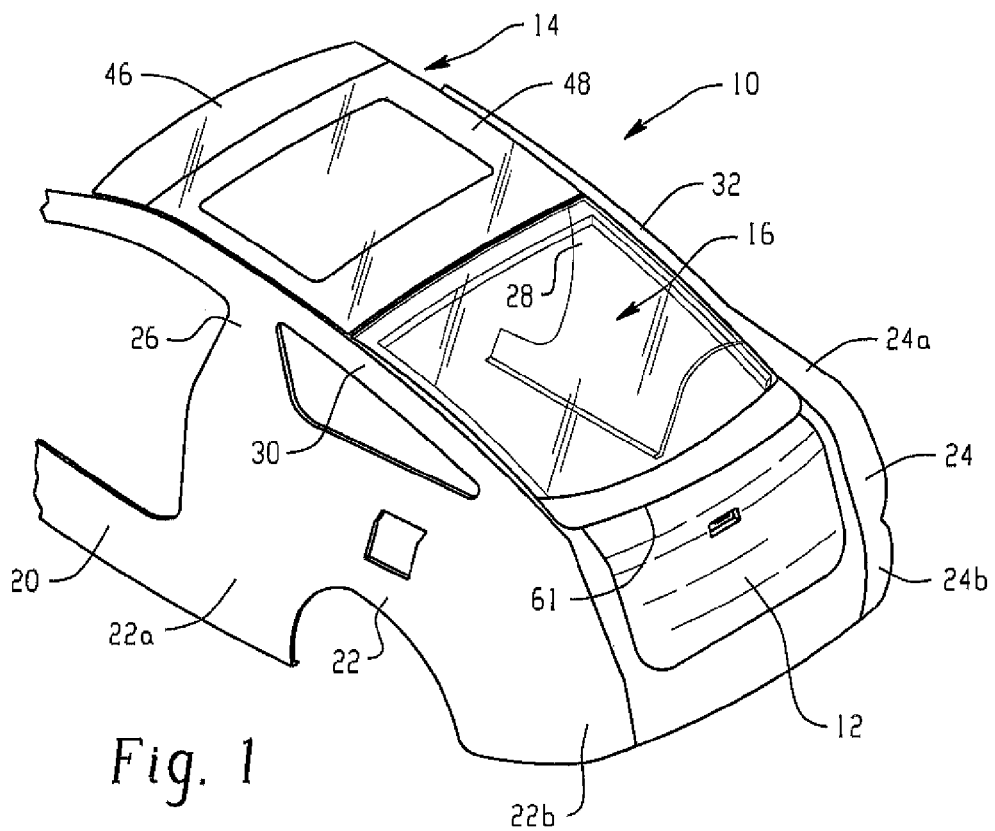
FIG. 1 is a schematic perspective view of a vehicle having a first closure slidably mounted to a vehicle body and a second closure pivotally mounted to the first closure, both closures shown in respective closed positions.
Figure 2:
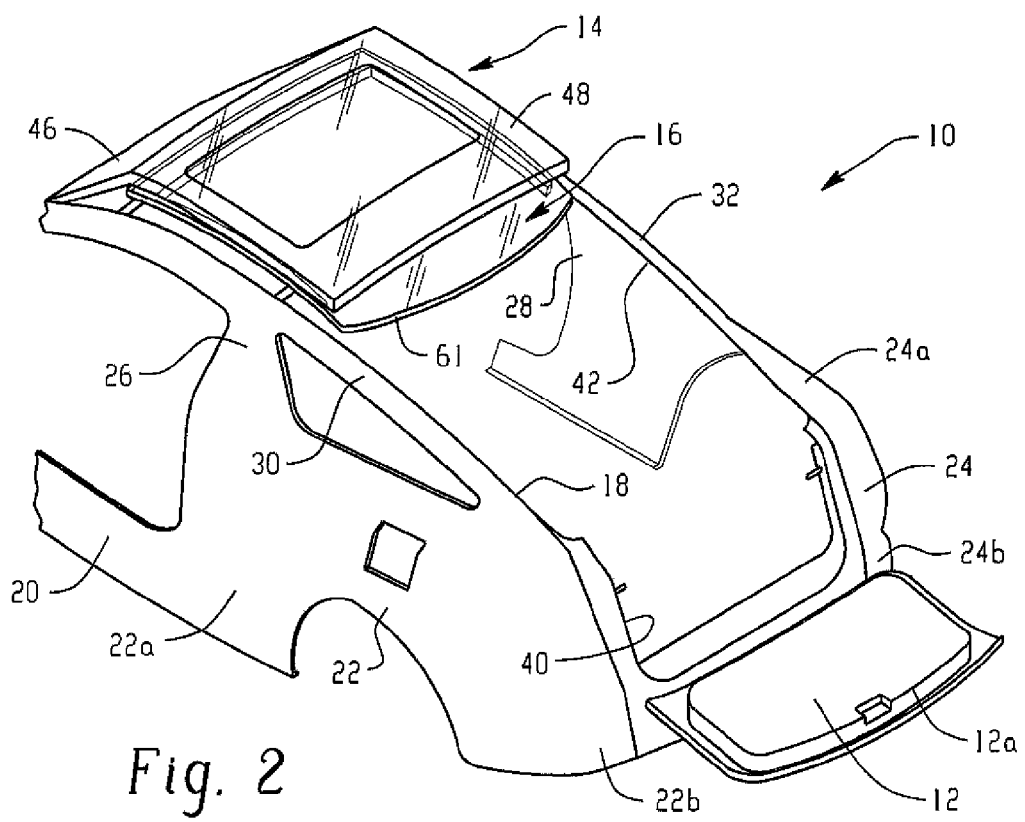
FIG. 2 is a schematic perspective view of the vehicle of FIG. 1 shown with the first closure in a slide open position and a tailgate disposed therebelow in an open position.

Referring now to the drawings wherein the showings are for purposes of illustrating one or more exemplary embodiments and not for purposes of limiting same, FIG. 1 illustrates a vehicle 10 having a tailgate 12, a panoramic roof assembly 14 and a dual-action rear hatch 16, also referred to herein as a rear closure assembly and/or a slide hatch assembly. As shown, the vehicle 10 can be a coupe-type vehicle and/or a hatchback vehicle, such as the type having a rear cargo opening 18 (FIG. 2). More particularly, the vehicle 10 has a vehicle body 20 that defines the cargo opening 18 between a pair of laterally spaced apart rear quarter panels or panel members 22, 24. As shown, the rear quarter panels 22, 24 have side portions 22a, 24a and rear corner portions 22b, 24b. The rear corner portions 22b, 24b define a rear portion of the vehicle body 20 in the illustrated embodiment.

The side portions 22a, 24a of the rear quarter panels 22, 24 include roof support members, including forward roof support members 26, 28 and rearward roof support members 30, 32. The forward roof support members 26, 28 can be the C-pillars of the vehicle body 20 and the rearward roof support members can be roof rails extending between the C-pillars and the rear corner portions 22b, 24b. More specifically, in the illustrated embodiment, the rearward roof support members 30, 32 are angularly oriented roof rails 30, 32 that have lower ends connected to the corner portions 22b, 24b and upper ends connected to the upper ends of the C-pillars 26, 28. The roof rails 30, 32 extend upward from the rear corner portions 22b 24b and thus extend from the rear portion of the vehicle body 20 defined by the rear corner portions 22b, 24b. As illustrated, the sliding hatch 16 extends laterally between rear quarter panels 22, 24 of the vehicle body 20 and extends longitudinally from the C-pillars 26, 28 of the vehicle body 20 to an upper edge 12a of the tailgate 12 of the vehicle. In the illustrated embodiment, the sliding hatch 16 extends downward at an angle from the C-pillars 26, 28 to the upper edge 12a of the tailgate 12.

With additional reference to FIG. 2, the rear cargo opening 18 has a rearward portion 40 and a forward portion 42. The forward portion 42 is contiguous with the rearward portion 40 to form the opening 18 as a relatively large opening in the vehicle body 20 on the vehicle 10. The rear quarter panels 22, 24 define lateral sides of the rear cargo opening 18, including lateral sides of each of the rearward portion 40 and the forward portion 42. In particular, the forward portion 42 of the cargo opening 18 is defined between the roof support members 30, 32 above the rear corner portions 22b, 24b. The rear or rearward portion 42 of the cargo opening 18 is defined between the rear corner portions 22b, 24b below the lower ends of the rear roof support members 30, 32. Accordingly, the rear roof support members 30, 32 define lateral sides of the forward portion 40 of the cargo opening 18 and the rear corner portions 22b, 24b define lateral sides of the rearward portion 42 of the cargo opening 18 at the rear of the vehicle 10.

Figure 3:
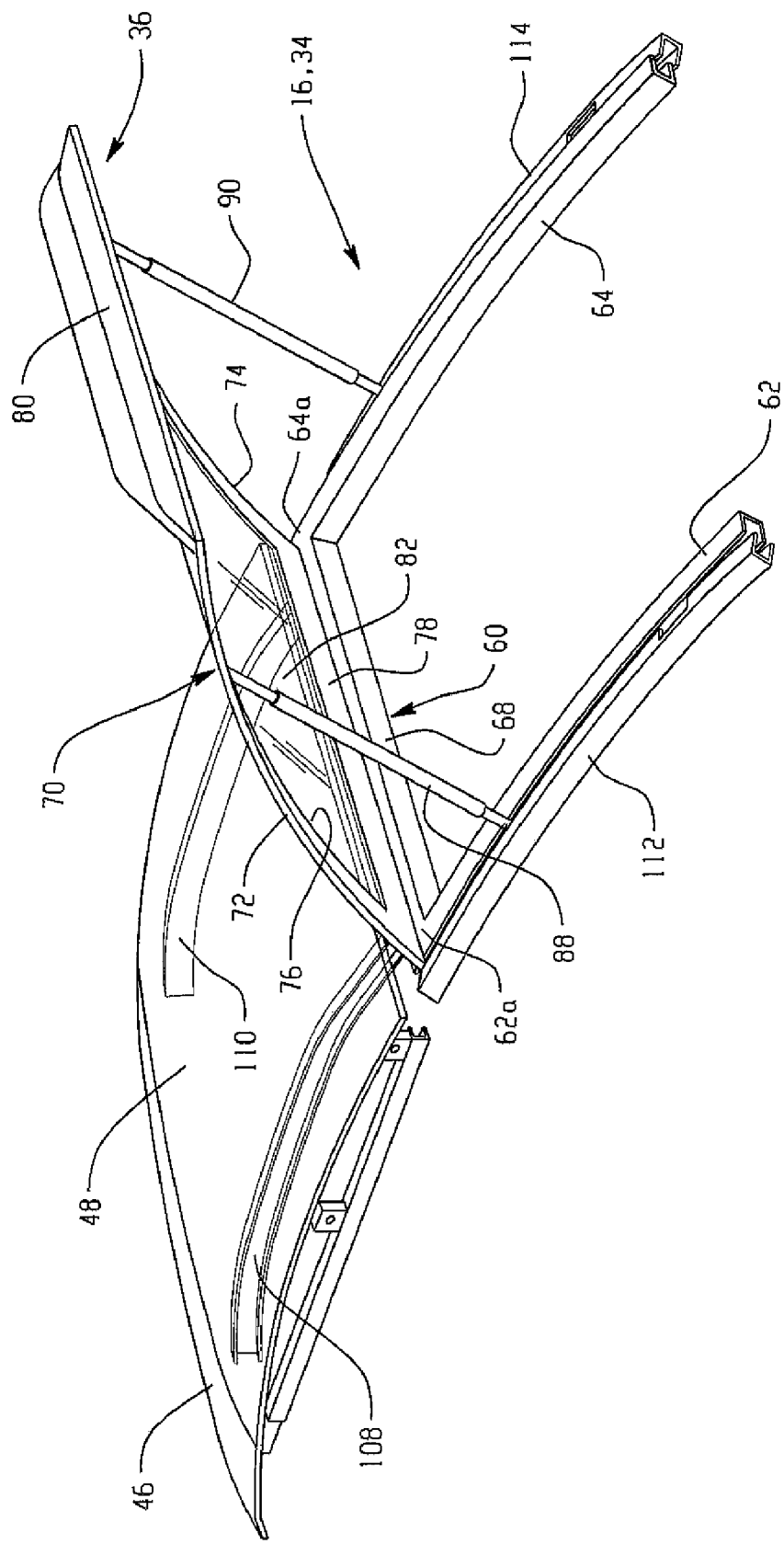
FIG. 3 is partial schematic perspective view of the vehicle of FIG. 1 showing the second closure in a pivot open position.
Figure 4:
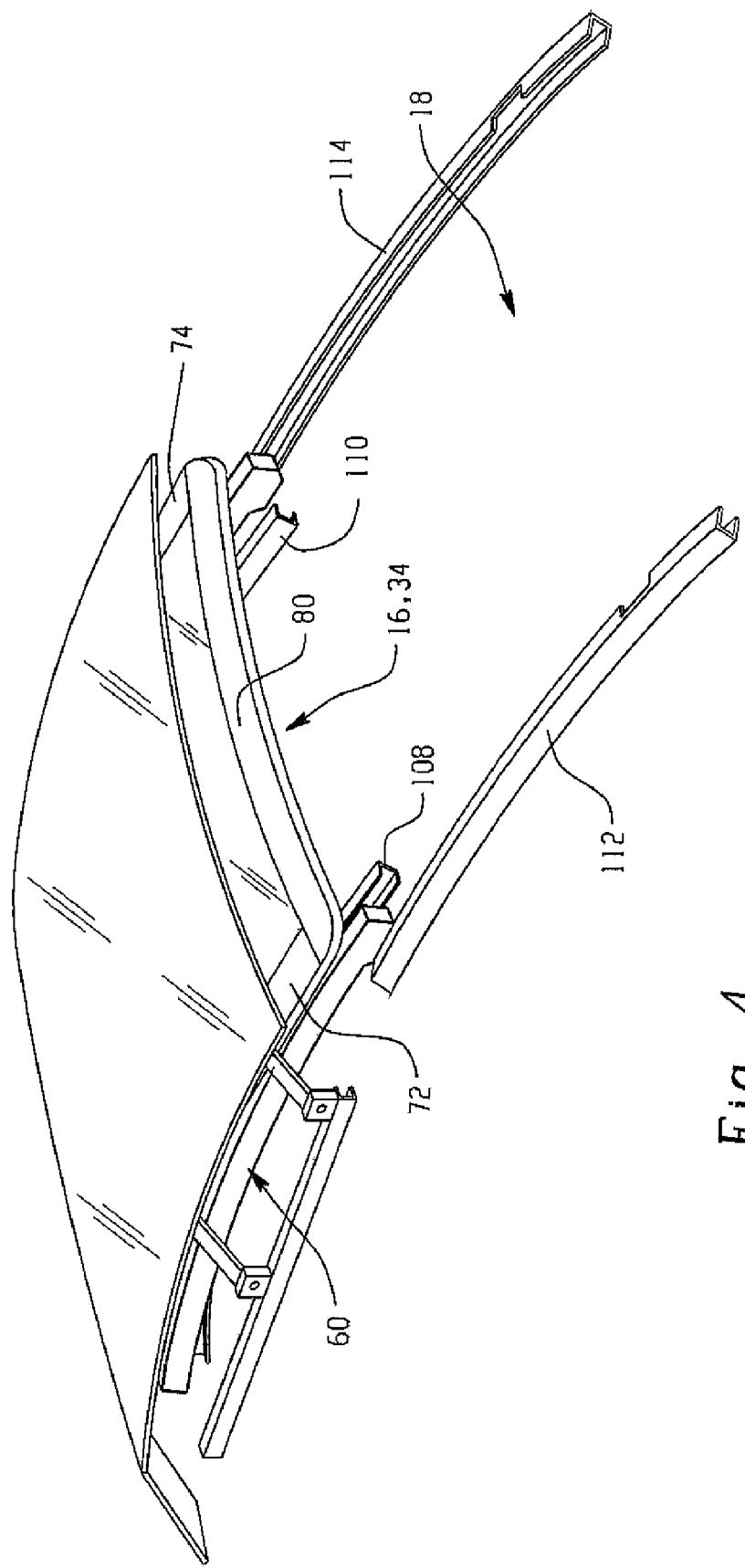
FIG. 4 is a partial schematic perspective view of the vehicle of FIG. 1 showing the first closure in a slide open position.

With additional reference to FIGS. 3-4, the rear closure assembly 16 includes a first closure 34 slidably mounted to the vehicle body 20 of the vehicle 10 for movement between a slide closed position (FIG. 1) and a slide open position (FIG. 4). The closure assembly 16, and particularly the first closure 34 thereof, further includes a second closure 36 pivotally mounted to the first closure 34 for movement between a pivot closed position (FIG. 1) and a pivot open position (FIG. 2). By this arrangement, the rear closure assembly 16 can selectively close the rear cargo opening 18. More particularly, the first closure 34 is a sliding hatch that is slidably mounted to the vehicle body 20 and the second closure 36 is a hatch closure pivotally mounted to the sliding hatch 16.

In the illustrated embodiment, the roof assembly 14 is a dual-panel assembly including a forward panel 46 and a rearward panel 48 hingedly connected to the forward panel 46 along adjacent edges of the panels 46, 48. The roof assembly 14, including the panels 46, 48, is disposed forward of the closure assembly 16 on the vehicle body 20. At least the rearward panel 48 is movable to one or more of raised positions for accommodating the closure assembly 16 below the roof panel 48 when moved to the slide open position. The hatch 16 can have a sliding mode wherein the hatch 16 slidably movable from the closed position shown in FIG. 1 to a slide forward or open position shown in FIGS. 2 and 4. In the slide open position, the rear hatch 16 is received under the roof assembly 14 with the roof assembly 14 in one of its raised positions. The hatch 16 can also have a flip-open mode wherein the rear hatch 16, and particularly the second closure 36, is flipped-open as shown in FIG. 3 while the rear hatch 16 remains in the slide closed position. This also provides access through the forward portion 42.

Figure 5:
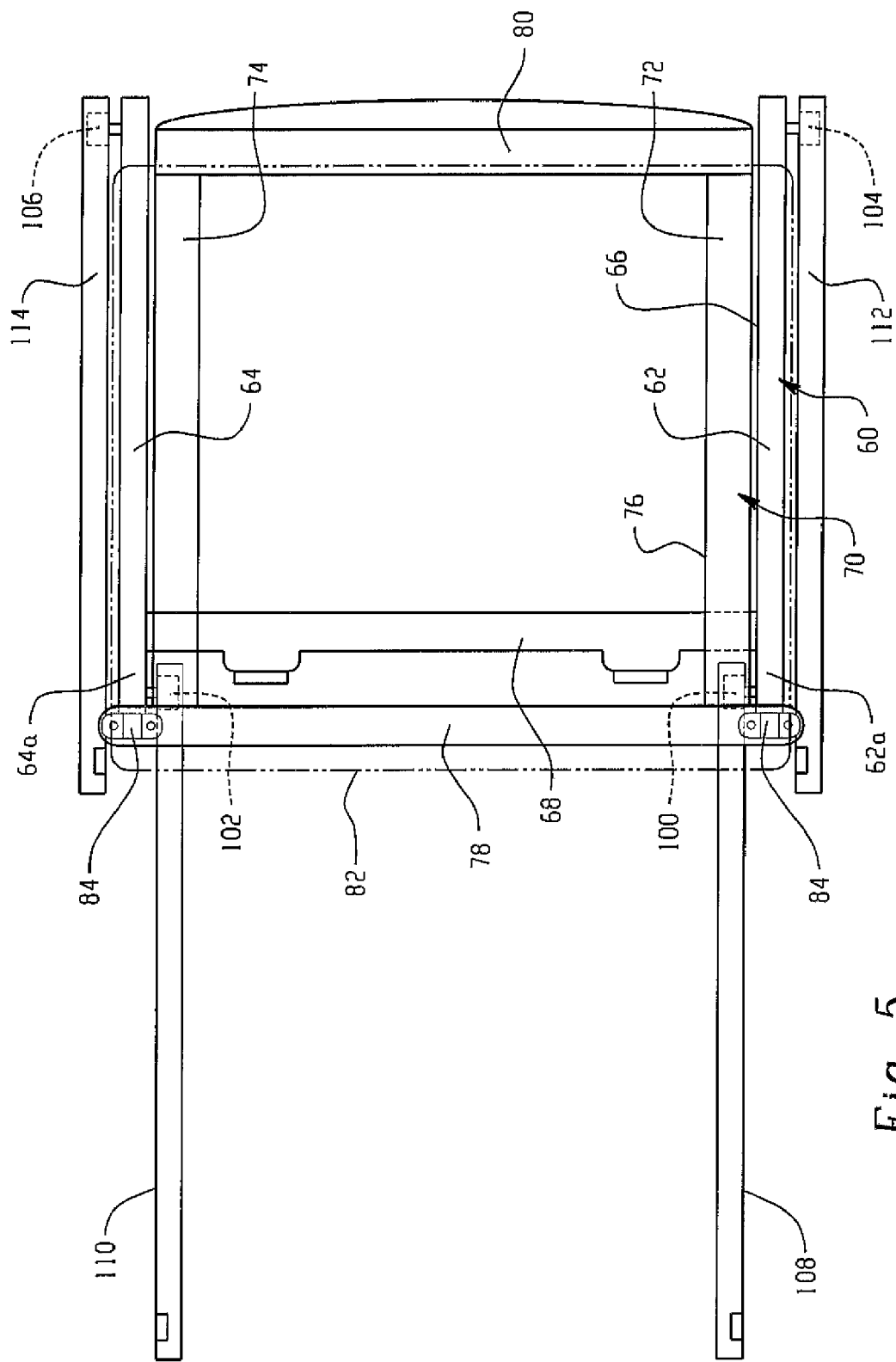
FIG. 5 is a partial schematic plan view showing the first closure slidably mounted to front and rear rails, which are themselves mounted to the vehicle body.

With further reference to FIG. 5, the sliding hatch 16 includes a hatch frame 60 slidably mounted to the vehicle body 20 and the hatch closure 36 pivotally mounted to the hatch frame 60. The hatch frame 60 slidably moves between the slide closed position and the slide open position, whereas the hatch closure 36 pivotally moves between the pivot closed position and the pivot open position. The hatch frame 60 of the illustrated embodiment includes spaced apart lateral side frame members 62, 64 defining a hatch opening 66 therebetween, the hatch opening 66 being a portion of the rear cargo opening 18. The side frame members 62, 64 extend along and adjacent the rear quarter panels 22, 24. The hatch frame 60 further includes an upper cross member 68 extending laterally between upper ends 62a, 64a of the lateral side frame members 62, 64. By this arrangement, the hatch frame 60 has a generally inverted U-shape formed by the lateral side frame members 62, 64 and the upper cross member 68 with an open end disposed rearwardly on the vehicle body 20.

As mentioned, the hatch closure 36 is pivotally mounted to the sliding hatch 16 for movement between the pivot closed position and the pivot open position, particularly when the hatch frame 60 is in the slide closed position. In particular, the hatch closure 36 is mounted to the lateral side frame members 62, 64 and closes the hatch opening 66 defined therebetween when in the pivot closed position. The hatch closure 36 includes a hatch closure or flip frame 70 having a pair of laterally spaced apart lateral side members 72, 74 defining a window opening 76 therebetween. The flip frame 70 further includes spaced apart cross members 78, 80 extending laterally between the lateral side members 72, 74 to further define the window opening 76. A window panel 82 spans across the window opening 76 and is supported by the side members 72, 74 and the cross members 78, 80.

The hatch closure 36, and particularly the flip frame 70, is pivotally mounted to the sliding hatch 16 by hinges 84 (only one shown in FIG. 4) disposed adjacent the upper ends 62a, 64a of the side frame members 24, 26. In particular, spaced apart hinges 84 pivotally mount the hatch closure 36 to the upper ends 62a, 64a of the lateral side frame members 72, 74. This allows the hatch closure 36, and particularly its hatch frame 70, to pivot from the pivot closed position of FIG. 1 to the pivot open position of FIG. 2. As shown, dampers 88, 90 can respectively mount the side members 72, 74 of the pivot hatch 36 to the lateral side members 62, 64 of the slide frame 60.

For slidably mounting the sliding hatch 16 onto the vehicle body 20, the sliding hatch 16 includes rollers 100, 102, 104, 106 movably mounted within corresponding tracks 108, 110, 112, 114 mounted to the vehicle body 20. In particular, the hatch frame 60 includes the rollers 100-106 connected thereto that slidably move the hatch frame 60 along the tracks 108-114 mounted to the vehicle body 20. The tracks 108-114 include a set of front tracks 108, 110 that are laterally spaced apart forward of the rear cargo opening 18 and a set of rear tracks 112, 114 laterally spaced apart and flanking the rear opening 18. The rollers 100-106 include front rollers 100, 102 mounted on a forward portion of the hatch frame 60 (i.e., adjacent the upper ends 62a, 64a) and received in the front tracks 108, 110 and rear rollers 104, 106 mounted to a rear portion of the hatch frame 60 and received in the rear tracks 112, 114. The rollers 100-106 roll along their respective tracks 108-114 to allow the sliding hatch 16 to slidably move relative to the vehicle body 20.

Figure 6:
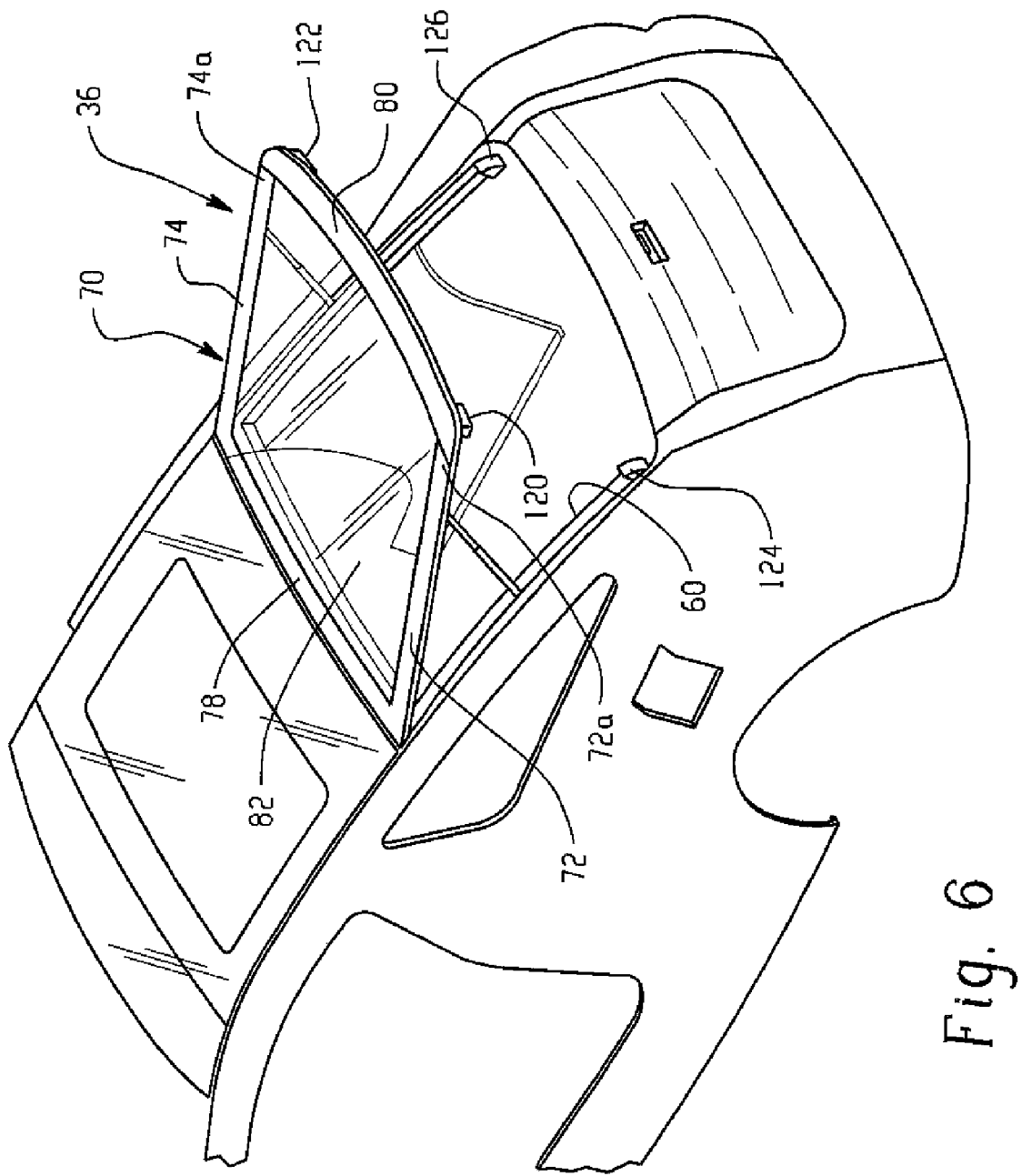
FIG. 6 is a schematic perspective view similar to FIG. 1, but showing the second closure in the pivot open position and schematically illustrating latches and strikers for the second closure.

With additional reference to FIG. 6, one of a striker or a latch can be disposed on the hatch closure 36 adjacent a lower end thereof and the other of the striker or latch can be disposed on the hatch frame 60 adjacent a lower end thereof so that the latch can selectively latch onto the striker for latching the hatch closure 36 in its pivot closed position. In the illustrated embodiment, the lateral side members 72, 74 of the flip frame 70 each include latches 120, 122 adjacent lower ends 72a, 74a of the lateral side members 72, 74 that selectively latch onto corresponding strikers 124, 126 mounted on the hatch frame 60. The latches 120, 122 latch onto respective strikers 124, 126 when the hatch closure 36 is moved to its pivot closed position. Powered actuators 120a, 122a can be operatively connected, respectively, to each latch 120, 122 for powered operation and/or locking of the latch. Operation of the latches and actuators is generally known and understood by those skilled in the art and therefore is not described in further detail herein.

Figure 7:
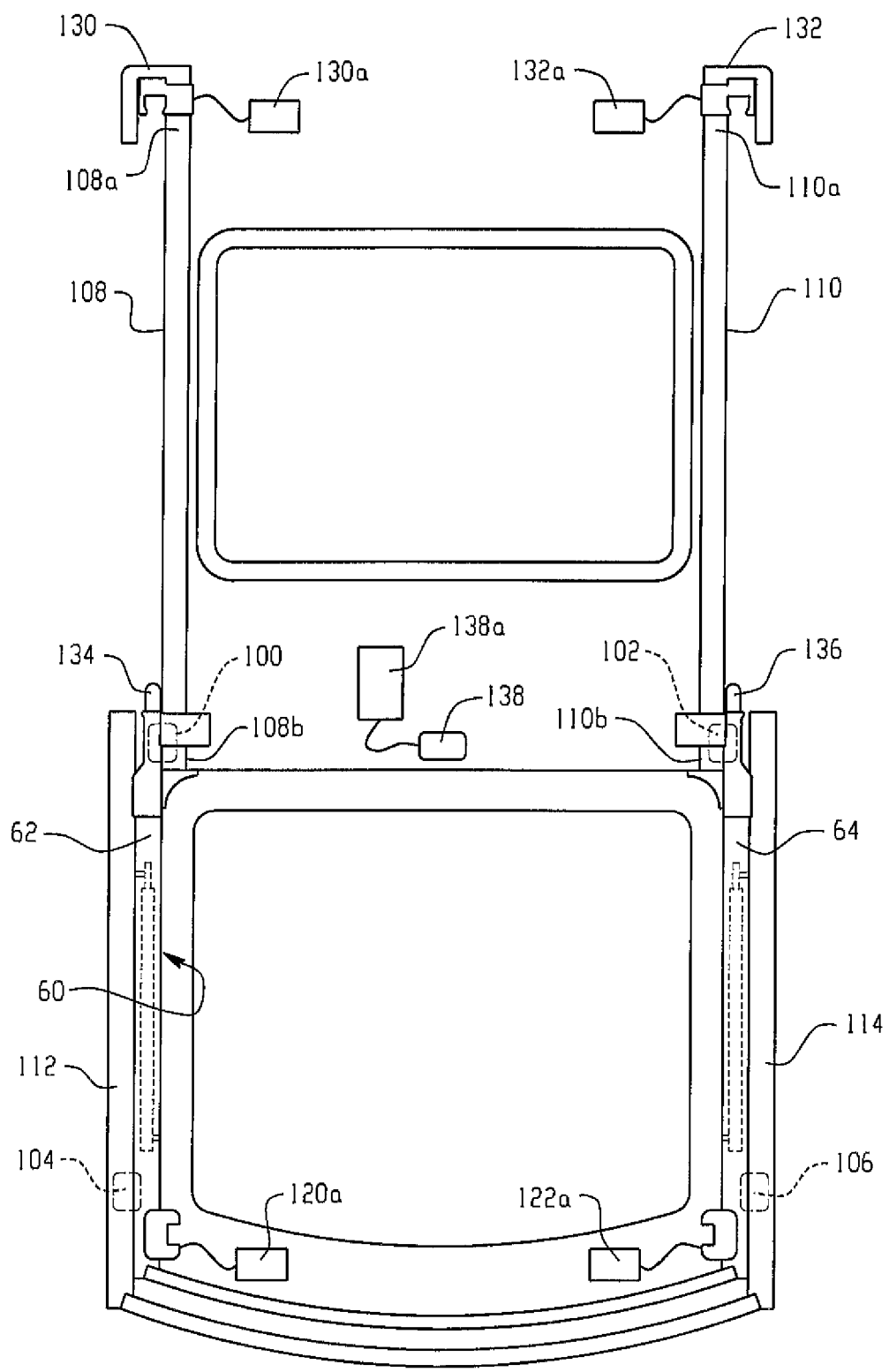
FIG. 7 is another schematic plan view schematically illustrating the locations for latches and strikers for the first closure.

With additional reference to FIG. 7, one of a striker or latch can also be disposed on the hatch frame 60 and the other of the striker or latch disposed on the vehicle body 20, wherein this latch selectively latches onto the striker for latching the slide frame in its closed position. More particularly, in the illustrated embodiment, latches 130, 132 are mounted at forward ends 108a, 110a of the front tracks 108, 110 and strikers 134, 136 are mounted to the hatch frame 60 at the upper ends 62a, 64a of the side frame members 62, 64. The latches 130, 132 latch onto the strikers 134, 136 when the slide frame 60 is moved to the slide open position to latch the slide frame 60 in the slide open position. Another latch 138 can be mounted on the vehicle body 20 (mounting not shown) between the front rails 108, 110 longitudinally adjacent rear ends 108b, 110b of the rails 108, 110. The latch 138 can selectively latch onto a striker (not shown) mounted on the hatch frame 60. Powered actuators 130a, 132a, 138a can be operatively connected, respectively, to each latch 134, 136, 138 for powered operation and/or locking of the latch. Again, operation of the latches and actuators is generally known and understood by those skilled in the art and therefore is not described in further detail herein.

In operation, the tailgate 12 and/or the rear hatch 16 can be opened for providing access through the rear cargo opening 18. For example, the sliding hatch 16 can be moved between the slide closed position of FIG. 1 and the slide open position of FIG. 1 When both the tailgate 12 is in the open position and the hatch 16 is in the slide open position, the vehicle 10 is transformed into a vehicle with truck-like cargo carrying capability, while the vehicle 10 can still remain as a coupe-type or other compact vehicle. Accordingly, in a coupe-type vehicle or other small vehicle, large cargo carrying capability is provided. The latches 130, 132 can latch onto the strikers 134, 136 for holding the first closure 34 in the slide open position and the latch 138 can latch onto the body mounted striker for holding the first closure in the slide closed position. Alternatively, when the slide hatch 16 is in the slide closed position, the hatch closure 62 can be moved or pivoted to the pivot open position as shown in FIG. 3 to provide access through the cargo opening 18, particularly through the hatch opening. The latches 120, 122 can latch onto the strikers 124, 126 for latching closed the hatch closure 36.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle, comprising:
    a vehicle body having a hatch frame slidably mounted thereto; and
    a hatch closure pivotally mounted to the hatch frame, the hatch frame slidably movable between a slide closed position and a slide open position and the hatch closure pivotally movable between a pivot closed position and a pivot open position;
    wherein the hatch frame includes:
        spaced apart lateral side frame members defining a hatch opening therebetween, the hatch closure pivotally mounted to the lateral side frame members and closing the hatch opening defined therebetween when in the pivot closed position;
        an upper cross member extending between upper ends of the lateral side frame members;
        spaced apart hinges pivotally mounting the hatch closure to the upper ends of the lateral side frame members;
        dampers respectively mounting side members of the hatch closure to the lateral side members; and
    wherein the hatch frame has a generally inverted U-shape formed by the lateral side frame members and the upper cross member with an open end disposed rearwardly on the vehicle body.

2. The vehicle of claim 1 wherein the hatch closure includes:
    a flip frame having spaced apart lateral side members defining a window opening therebetween, and spaced apart cross members extending between the lateral side members to further define the window opening; and
    a window panel spanning across the window opening.

3. The vehicle of claim 2 wherein the lateral side members of the flip frame each include latches adjacent lower ends of the lateral side members that selectively latch onto corresponding strikers mounted on the hatch frame.

4. The vehicle of claim 1 wherein the hatch frame includes rollers connected thereto that slidably move the hatch frame along tracks mounted to the vehicle body.

5. The vehicle body of claim 1 wherein the hatch frame slidably mates against a structural member of a windowless flip-down tailgate when the hatch frame is in the slide closed position.

6. A slide hatch assembly for selectively closing a rear cargo opening on a vehicle, comprising:
    a sliding hatch slidably mounted to a vehicle body of the vehicle for movement between a slide closed position and a slide open position; and
    a hatch closure mounted to the sliding hatch for movement between a pivot closed position and a pivot open position when the sliding hatch is in the slide closed position, wherein the sliding hatch includes a hatch frame having a generally inverted U-shape formed by a pair of laterally spaced apart side frame members and a cross member extending laterally between the side frame members at upper ends thereof with an open end disposed rearwardly on the vehicle body.

7. The slide hatch assembly of claim 6 wherein the hatch closure includes a hatch closure frame having a pair of laterally spaced apart hatch closure side members and a hatch closure cross member extending laterally between the hatch closure side members.

8. The slide hatch assembly of claim 7 wherein the hatch closure frame is pivotally mounted to the hatch frame by hinges disposed adjacent upper ends of the side frame members.

9. The slide hatch assembly of claim 8 wherein one of a striker or a latch is disposed on the hatch closure adjacent a lower end thereof and the other of the striker or latch is disposed on the hatch frame adjacent a lower end thereof, the latch selectively latching onto the striker.

10. The slide hatch assembly of claim 6 wherein a roof panel is disposed forward of the slide hatch and the slide hatch is in contiguous relation to the roof panel when the slide hatch is in the slide closed position, the roof panel movable by a lifting assembly to a raised position wherein the roof panel is elevated to accommodate the slide hatch therebelow when the slide hatch is moved forward to the slide open position.

11. A rear closure assembly for a vehicle, comprising:
a first closure slidably mounted to a vehicle body of the vehicle for movement between a slide closed position and a slide open position, wherein the first closure has a hatch frame with a generally inverted U-shape formed by the lateral side frame members and the upper cross member with an open end disposed rearwardly on the vehicle body; and
a second closure pivotally mounted to the first closure for movement between a pivot closed position and a pivot open position.

12. The rear closure assembly of claim 11 wherein the first closure extends laterally between rear quarter panels of the vehicle body and extends longitudinally from C-pillars of the vehicle body to an upper edge of a tailgate of the vehicle.

13. The rear closure assembly of claim 12 wherein the first closure extends downward at an angle of greater than 20° from the C-pillars to the upper edge of the tailgate.

14. The rear closure assembly of claim 12 wherein the first closure includes side frame members extending along and adjacent the rear quarter panels to define a hatch opening therebetween, the second closure closing the hatch opening when in the pivot closed position.

* * * * *